(No Model.) 6 Sheets—Sheet 1.

J. L. HASTINGS.
PROCESS OF AND APPARATUS FOR THE MANUFACTURE OF GAS.

No. 505,525. Patented Sept. 26, 1893.

Fig. 1

Witnesses:
D. L. Dorsey.
Wm. J. Martin.

Inventor:
James L. Hastings.
By Kay, Totten & Cooke
Attorneys.

(No Model.) 6 Sheets—Sheet 2.

J. L. HASTINGS.
PROCESS OF AND APPARATUS FOR THE MANUFACTURE OF GAS.

No. 505,525. Patented Sept. 26, 1893.

Witnesses:
D. L. Dorsey.
Wm. J. Martin.

Inventor,
James L. Hastings
By Kay, Totten & Cooke,
Attorneys.

(No Model.) 6 Sheets—Sheet 3.

J. L. HASTINGS.
PROCESS OF AND APPARATUS FOR THE MANUFACTURE OF GAS.

No. 505,525. Patented Sept. 26, 1893.

Witnesses:
D. L. Dorsey
Wm. J. Martin

Inventor
James L. Hastings
By Kay, Totten & Cooke
Attorneys

(No Model.) 6 Sheets—Sheet 4.

J. L. HASTINGS.
PROCESS OF AND APPARATUS FOR THE MANUFACTURE OF GAS.

No. 505,525. Patented Sept. 26, 1893.

Witnesses:
D. L. Dorsey
Wm. J. Martin

Inventor:
James L. Hastings
By Kay, Totten & Cooke
Attorneys.

(No Model.) 6 Sheets—Sheet 5.

J. L. HASTINGS.
PROCESS OF AND APPARATUS FOR THE MANUFACTURE OF GAS.

No. 505,525. Patented Sept. 26, 1893.

UNITED STATES PATENT OFFICE.

JAMES L. HASTINGS, OF PHILADELPHIA, PENNSYLVANIA, ASSIGNOR TO THE NATIONAL HEAT AND POWER COMPANY, OF SAME PLACE.

PROCESS OF AND APPARATUS FOR THE MANUFACTURE OF GAS.

SPECIFICATION forming part of Letters Patent No. 505,525, dated September 26, 1893.

Application filed November 7, 1892. Serial No. 451,166. (No model.)

*To all whom it may concern:*

Be it known that I, JAMES L. HASTINGS, a resident of Philadelphia, in the county of Philadelphia and State of Pennsylvania, have invented a new and useful Improvement in Processes of and Apparatus for the Manufacture of Gas; and I do hereby declare the following to be a full, clear, and exact description thereof.

My invention relates to the manufacture of gas for illuminating or heating purposes, its object being, so far as the manufacture of illuminating gas is concerned, to provide for the generation of a large body of water gas, and the proper carburizing of the same, and the fixing of the resultant gas and vapor, as well as the reduction of any carbonic acid formed, and to provide for the maintaining of the heat for fixing the hydrocarbons, so that a longer continuous run in the manufacture of the gas may be carried on, and during said run a heat may be maintained that is proper for carburizing and fixing, but which is not so high as to break up the hydrocarbons, so that a smaller proportional quantity of hydrocarbons is required to form an illuminating gas of high candle power, and the gas formed shall be of more even quality. For the formation of a heating gas I am also enabled to produce a large quantity of gas of high heating power in proportion to the materials employed, and to manufacture the same without the necessity of so frequent a heating up of the apparatus.

To these ends my invention consists, generally stated, in generating water gas and without superheating the gas introducing oil or like hydrocarbons into the water gas generated in the first part of the run, and carrying the combined gas and vapors through the body of fixing materials and generating water gas in a later part of the run, superheating such gas and introducing the oil into the superheated water gas, and carrying such combined gas and vapor through the fixing materials; such course being followed during a single run, or operation, of gas making, and the heated fixing material serving during the first part of the run to both vaporize the oil and fix the gas, while during the later part of the run the super-heated gas serves for the vaporization of the oil, and, to some extent, causes the fixing of the gases formed therefrom, overcoming the chilling effect of oil upon the gases and so providing for the continuation of a run for a longer period than in the ordinary operation of gas making, and the production of a more even quality of gas.

My invention also consists in forming the water gas and introducing the hydrocarbons into the heated water gas and carrying the combined heated gas and vapor first downwardly through a body of refractory material to partially fix the same and thence downwardly through a mass of heated coke to complete the fixing of the gases and vaporize any of the oil which has not been vaporized within the refractory material, and by bringing the combined water gas and vapor into close contact with each other within the body of heated coke to cause the generation of a larger proportional quantity of marsh and heavy hydrocarbon gases by the intimate contact of the particles of gas and vapor in the presence of the coke, a peculiar chemical action being produced by the same resulting in a reduced proportion of carbonic oxide, as well as the reduction of any carbonic acid present.

It also consists in certain other improvements in the steps of the process carried out, and in the apparatus employed for carrying out such process, as will be hereinafter particularly set forth.

To enable others skilled in the art to practice my invention, I will describe the same more fully, referring to accompanying drawings in which—

Fig. 3 is a longitudinal central section thereof.

Like letters of reference indicate like parts in each of the views.

Figure 1:
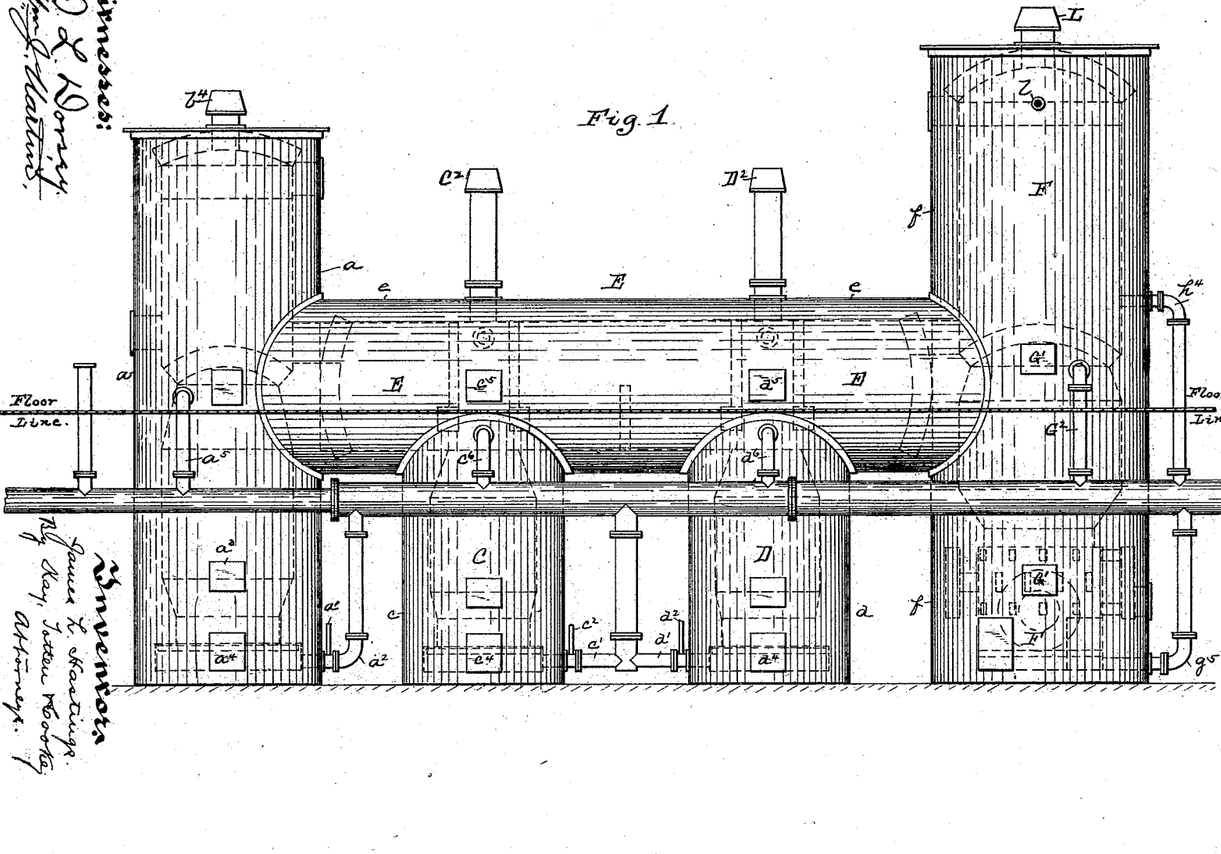
Figure 1 is a side view of the apparatus embodying the invention.

The apparatus illustrated in Fig. 1 will be most particularly described, as it shows the most approved plan of apparatus suitable for practicing the invention. The apparatus of Fig. 10, being a modification of the same suitable for use for smaller plants, will be generally described hereinafter.

In the apparatus shown in Fig. 1, I employ a vertical furnace A containing a cupola generator A' in the base and a superheating chamber B in the upper part thereof, and adjoining the same is a horizontal body portion E from which depend the cupola generators C D, the body portion E extending from the first furnace A to the second furnace F which contains the coke chamber G in the lower part thereof, and the chamber H in the upper part thereof containing refractory fixing materials, as hereinafter described. For the purpose of superheating the steam, I also preferably employ the steam superheater I. These are the parts of the gas making apparatus, and I will now describe them in detail.

Figures 7, 8:
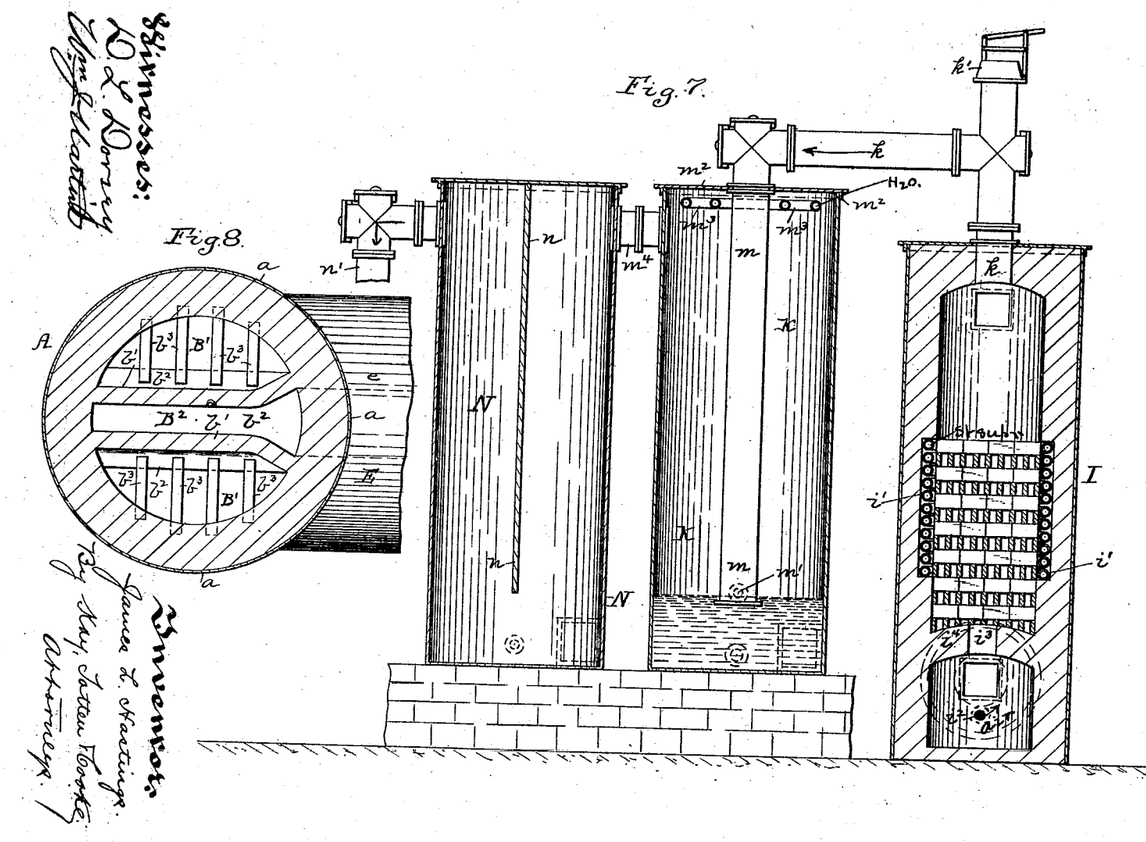
Fig. 7 is a longitudinal section on the line 7—7 Fig. 2.
Fig. 8 is a cross section on the line 8—8 Fig. 3.

The cupola generator A' is in the lower part of the first furnace A, and has the grate $a^6$, the steam entrance $a'$, the air entrance $a^2$, the feeding door $a^3$ (with which any suitable form of charging apparatus may be employed, if desired), and the ash-pit door $a^4$ for removing ashes and clinkers. In the upper part of the cupola generator A' is also the air entrance $a^5$. In the upper part of the furnace A is formed the gas superheating chamber B above referred to, and extending centrally and longitudinally across the furnace at the base of said chamber is the arch $b^2$ on which are supported the two vertical walls $b'$ which form a narrow vertical down-take passage $B^2$ leading centrally from the upper part of the gas superheating chamber to the entrance port $b$ leading into the horizontal body portion E of the gas apparatus. The vertical walls $b'$ terminate a short distance below the top of said gas superheating chamber and the spaces $B'$ on each side thereof are filled with checker work or loose refractory material, which is supported upon the tiles $b^3$ which extend from said arch $b^2$ over to the walls of the chamber, as shown in Fig. 8. The gas superheating chamber is thus formed of two side chambers $B'$ which communicate at the base with the cupola generator A' so that the gases and products may rise from said generator into said chambers, and the down take chamber $B^2$ leading from the upper part of the superheating chamber to the entrance $b$ to the horizontal body portion E; and in the blowing up of the apparatus a large amount of heat can be stored in this gas superheater. The furnace A has also the outlet or relief valve $b^4$ which may be opened in the heating up to permit the escape of heated products. By forming the central arch $b^2$ and supporting thereon the walls $b'$ extending entirely across the furnace and supported by the walls thereof, a simple and durable form of up-take and down-take chamber is provided, which can be constructed at small cost and is much stronger and more durable than any tile or cylinder construction, which could not be properly braced and supported.

By the construction of the horizontal body portion E within its casing $e$ extending between the two vertical furnaces and their casings $a\ f$, about midway in the height of the furnaces and the cupola generators C D depending from said body portion and inclosed in their casings $c\ d$, I am enabled to provide a simple and compact form of cupola generators which will also act as a conduit for the gases generated in the furnace A to the second furnace F, the construction enabling me to properly connect and brace the two main furnaces, not simply by a short pipe of small sectional area, but by a large metallic cylinder connected to the casings of the furnace and of such diameter as to form a strong bracing connection between the casings of the two furnaces, while at the same time the large cylindrical body portion provides a compact means for including other cupola generators within the apparatus. It will be noticed that while the fire brick linings of the two furnaces A F are properly braced by their casings $a\ f$, there is no proper bracing for the portions of such linings opposite the horizontal body portion to receive any strain or pressure brought upon that portion of the lining. For the purpose of properly supporting this portion of the linings of the main furnaces A F, I form at the end of the horizontal body portion the arched end walls $e^2$ and which are supported from the main fire brick linings $e'$ of the horizontal body portion, and by their arched construction provide for the proper bracing of the walls of the furnace. Through these arches $e^2$, the ports leading from or to the horizontal body portion are formed, such, for example, as the port $b$, leading from the gas superheating chamber B, and the port E' leading into the second furnace F. It will be noticed that the casings $c, d$, in which the cupola generators C, D, are inclosed are connected to the horizontal body portion and extend down to and rest on the foundation; they are thus braced by the casing of the horizontal body portion, so that by means of the end vertical casings inclosing the first and second chambers, the horizontal casing in inclosing the horizontal body portion, and the depending casing inclosing the cupola generators C, D, a compact and well braced furnace in gas apparatus is obtained. The cupola generators C, D, have the ordinary provisions for the entrance of air and steam, such, for example, as the air entrances $c', d'$, and steam entrances $c^2, d^2$, which may communicate with the air pipes as shown, and are also preferably provided with the grates $c^3\ d^3$ and the ash doors $c^4, d^4$, and suitable feeding doors, $c^5$, $d^5$, the doors shown in the drawings being in the side walls of the body portion E.

Figure 6:
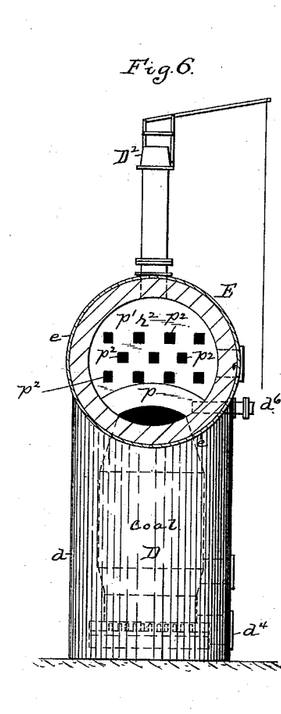
Fig. 6 is a vertical cross section on the line 6—6, Fig. 3.

It is desirable to have as large a heating surface as practicable within the gas apparatus, and I have therefore found it desirable to utilize the horizontal body portion as a gas superheater as far as practicable, though I find the apparatus to operate well when it simply acts as a portion of the cupola generators and as the conduit from one furnace to the other. When employed as a gas superheater, I prefer to construct it as follows:—Extending over each of the cupola generators are the arches $p$, which arches form supports for the walls $p'$, extending to the top of the body portion as shown by the cross section Figs. 3 and 6, and having ports $p^2$, formed at intervals therein to permit the passage of gas between such walls. They thus provide feeding chutes or chambers C', D', to guide the coal or other carbon into the cupola generator, and the charging doors $c^5$, $d^5$, extend through the walls of the horizontal body portion and communicate with such chutes C', D'. Opening from both these chutes are relief valves $C^2$, $D^2$, which can be opened when necessary in the heating up of the apparatus, and so provide as even a heat as practicable throughout the same. The horizontal body portion has between the said chutes C', D', the vertical bridge $e^3$, by which the heated products are directed toward the upper part of the chamber, the ports in the walls $p'$, being preferably made at points below the top of said bridge so as to cause the heated products and gases to follow a circuitous course through the horizontal body portion. The spaces $r$, $r'$, $r^2$, thus provided in the horizontal body portion are filled with checker work, the space $r^3$ containing no checker work and this checker work acts as a heat absorbent and so provides a very large body, first, for absorbing the heat in blowing up, and, second, for superheating the gases made in the several cupola generators.

For the purpose of properly heating and blowing up the apparatus, it will be seen that I provide the air entrances $c^6$, $d^6$, at the mouths or upper parts of the cupola generators C, D, which will provide for the burning of the gases formed in the blowing up in order to heat the horizontal body portion and the checker work therein.

The second heating furnace F, forms what may be termed the fixing portion of the gas apparatus, having in the upper part thereof the primary fixing chamber H, containing refractory material, and in the lower part thereof the final fixing chamber G, which contains a body of coke. The construction of the fixing chamber H, is substantially the same as that of the gas superheating chamber B, though in the gas making operation the gases travel in the opposite way through the same. It differs only in a few particulars which will be pointed out. In the first place, it is provided with the central longitudinally extending arch $h$, from which the walls $h'$, extend upwardly but not to the top of the fixing chamber, said walls extending entirely across the furnace and being supported at their ends by the furnace walls and so forming the uptake chamber H', and the down-take chambers $H^2$. At the bases of the down-take chambers $H^2$, are the tiles $h^2$, which extend over from the arch $h$, to the side walls and form supports for the checker work within the chambers $H^2$. I also prefer to fill the upper part of the chamber H', with checker work, and for this purpose provide the tiles $h^3$, extending across the same some distance from the base, as shown more particularly in Figs. 3 and 9. The port E' leading from the horizontal body portion E communicates with the central chamber H' so that the gases and products will pass upwardly through the same and then downwardly through the chambers $H^2$. For the purpose of burning the gases in heating up this fixing chamber, I provide the air entrance $h^4$ which preferably enters the chamber H' opposite to the port E' so as to be forced against the heated products and intermingle therewith to cause a full combustion thereof. The fixing chamber is provided also with the relief valve L which can be opened as desired for the proper heating of the furnace. In the upper part thereof it has one or more oil entrances $l$ with which the oil supply pipes communicate, the oil being preferably introduced into the furnace by means of a steam jet, employing superheated steam for the purpose. As part of the oil which will fall within the vertical chamber H', that is, the heavier portions thereof may not be entirely vaporized therein, and may descend through the checker work, I provide the chamber H' with a sand bed $h^5$, being a bed of porous sand spread over or supported on the floor of the chamber to receive such heavy hydrocarbons and support the same until they are properly gasified and taken up.

The lower portion of the second furnace F contains the coke chamber G and this chamber communicates in turn with the flue $i$ leading to the steam superheater I. The preferred construction of the coke chamber is as follows:—In the lower portion thereof the chamber is reduced in diameter so as to provide room in the walls for the formation of the annular space $g$, and communicating with that space is the series of ports $g'$ through which the gases pass into the annular space, the annular space communicating with the outlet passage $i$ leading to the steam superheater. Above such contracted portion the walls flare outwardly, as at $g^2$, so that the fixing chamber shall contain a body of coke which is wider or extends out beyond the contracted lower portion in order to insure the passage of the gases through the coke. The coke chamber is provided with the charging doors G' and with the air entrance $G^2$, providing for the entrance of air or the utilizing of the gases formed in the coke chamber in part of the blowing up operation, as hereinafter referred to. In the base of this coke chamber are the grate $g^4$ and the usual ash door, and communicating with the chamber under the grate is the air entrance $g^5$.

The steam superheater is contained within a separate casing located close to and preferably at the side of the main body of the gas apparatus, as shown in the plan view, and it communicates at the base with the gas making apparatus through the passage $i$, and at the top by means of the eduction pipe $k$ with the washer K. It also has the relief valve $k'$ in the upper part above the gas eduction pipe. It is a circular chamber having a recess in the walls thereof within which is coiled the steam pipe $i'$, as shown in vertical section, a large surface for steam superheating being provided in this way. It is also filled with a body of checker work, or like loose refractory material, which will act as an absorbent so that the heat from the gases or heated products may be stored in the checker work and act to impart their heat to or maintain the steam within the pipe at a high even temperature, it being found that after the gases and products have passed through this chamber their temperature is so reduced that the eduction pipe is not raised to any great heat, not greater than the hand can bear on its surface, the mass of heat being thus absorbed from the gases before they pass into the wash box. It may in some cases be desirable to add air to support combustion within this steam superheater, and for that reason I provide the air entrance $i^2$ communicating with the passage $i$ leading from the fixing chamber into the steam superheater.

For supporting the checker work within the superheater, I provide the arch $i^4$ which may be perforated centrally at $i^3$ or at different points to permit the passage of the products of combustion and the gases.

Figures 2, 9:
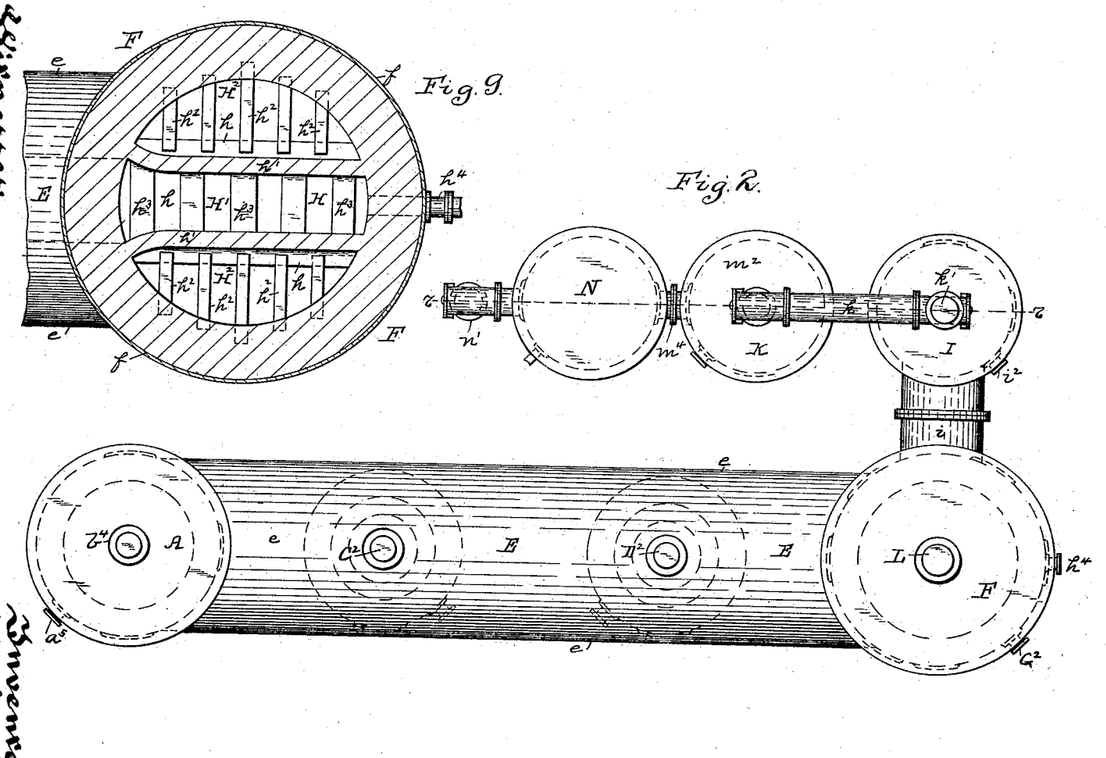
Fig. 2 is a plan view, partly in section.
Fig. 9 is a cross section on the line 9—9 Fig. 3.
Figure 4:
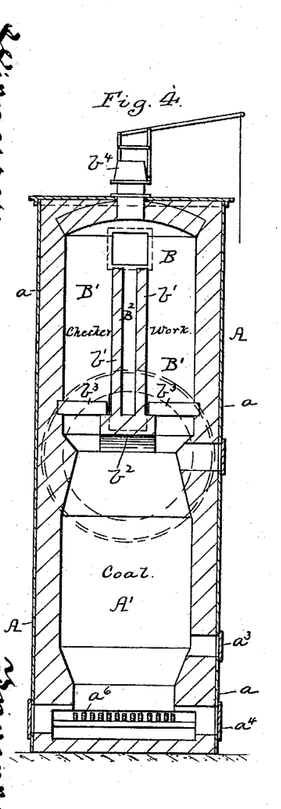
Fig. 4 is a vertical cross section on the line 4—4, Fig. 3.
Figure 5:
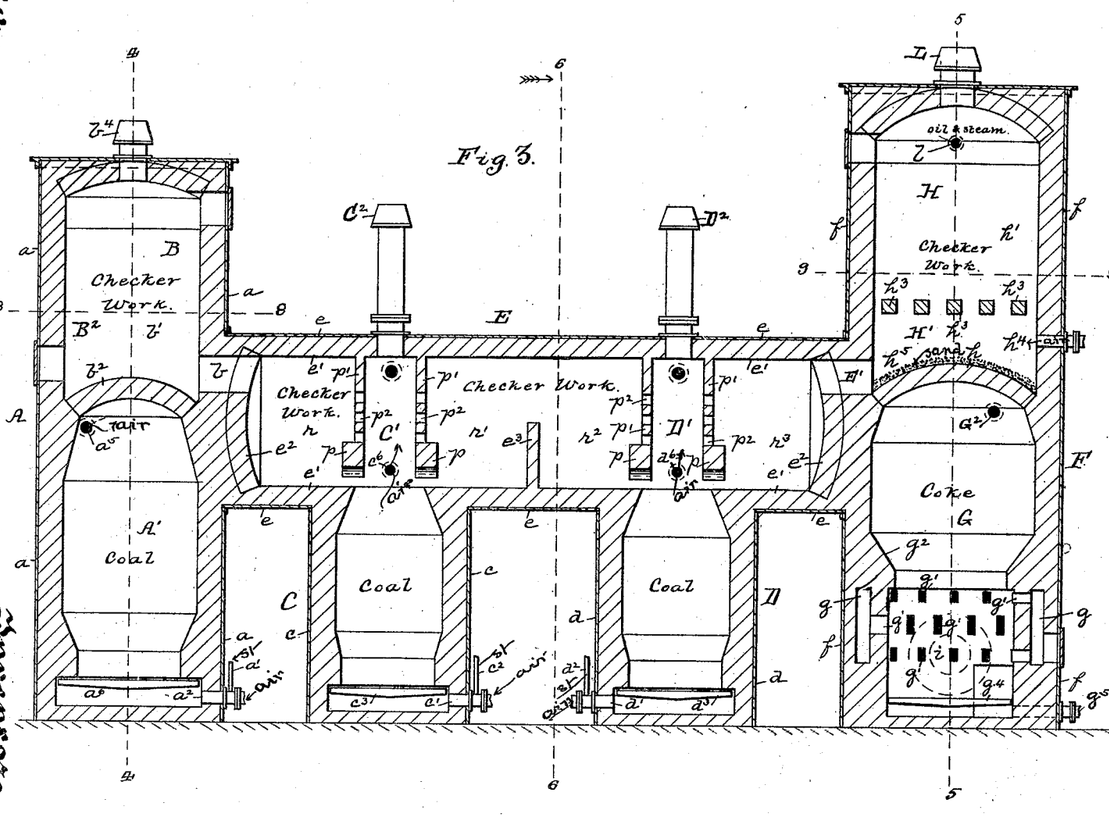
Fig. 5 is a vertical cross section on the line 5—5, Fig. 3.

To provide as compact an apparatus as possible, both for the manufacture of gas and the washing and scrubbing of the same, so as to deliver it ready to enter into the storage tank, I arrange a washer K and scrubber N, as shown in Fig. 2, the same being located parallel with the main gas generating apparatus, and the current being in the opposite direction through the same to that in the main gas generating apparatus. The washer K is placed close to the steam superheater I, and the outlet pipe from the superheater leads over above the washer K, the washer being contained within a suitable vertical cylindrical casing and having at the base of the casing the overflow pipe $m'$ which acts as a water-seal for the main gas inlet pipe $m$ which leads directly through the washer from the top thereof below the overflow pipe, being sealed by the water in the base of the washer. The top or cover $m^2$ of the washer is removable, and the inlet pipe $m$ removable with it being suspended from the cover. It thus provides for easy access, by disengaging the connecting pipe leading from the superheater, when the cover and inlet pipe may be raised to permit of refilling or repair. Such construction of the superheater and the washer located close to each other, and the carrying of the inlet pipe to the washer directly downwardly through the same, simplifies to a very great extent the construction of gas making apparatus, and does away entirely with the necessity of a separate wash box, while at the same time the inlet pipe is exposed to the water descending through the washer and is cooled thereby, and the cooling effect upon the gases by the passage through the washer takes place immediately after the gases have left the superheater, and while they are descending to the washer seal. The washer has suitable water spray pipe or pipes $m^3$ at its upper end, and it is filled with interlacing pieces of wood of suitable kind, or like means for imparting a circuitous course to the gases as they rise through the same, and bringing the gases into contact with the descending water so as to properly wash the same before the passage of the gas from the washer through the passage $m^4$ into the scrubber N. The construction of the scrubber does not require description, except that it is filled with suitable materials for scrubbing the gas and is divided into two compartments by the vertical partition $n$ of the scrubber, and has the outlet pipe $n'$ leading to the wash box.

It will be noticed that throughout the entire apparatus above described, there are no gas cut-off valves which would require to be opened or closed during the gas making operation. The only valves provided in the whole apparatus, further than for controlling the entrance of air, steam, and oil, are the relief valves or caps on the different relief openings of the first and second furnaces, and the horizontal body portion of the steam superheater. This is of great advantage in view of the fact that such valves are liable to get out of order on account of the exposure to high and changing temperatures, and generally form one of the sources of trouble in gas making apparatus; the present apparatus being operated in blowing up by the opening of the relief valves when no gas is carried to the tank, as the gases have free escape through such relief valves; and when the relief valves are closed, the gas is compelled to pass through the steam superheater and into the washer and thence to the tank, as no other course is open to it.

In making gas in accordance with the process forming the subject matter of this application, and by the apparatus above described, fire is kindled in the cupola generators A' C D, and they are gradually filled with coal through the regular charging ports or doors, while the air in suitable quantities is being supplied to them to gradually raise the coal to incandescence. Fire is also kindled in the coke chamber or final fixing chamber G, and coke is fed to that chamber. I prefer to use coke in this chamber, but anthracite coal or other carbon suitable for fixing may be employed. As these chambers are gradually heated up, the several relief valves are opened and active combustion of the coal in the three generators A' C D is obtained, the generator or producer gas from these chambers being utilized in heating up the several parts of the apparatus; for example, in the first furnace A the generator gas rising from the cupola generator A' is met by the current of air in the upper part thereof and burned within the chambers B², heating the checker work therein, and, during the first part of the blowing up, escaping through the relief valve at the top of the furnace. The same action is obtained over the other two generators, but the relief valves for those generators are soon closed and the producer gas from the same burned within the horizontal body portion to heat the checker work contained therein, or carried over to the primary fixing chamber H, entering the vertical chamber H' and being burned therein, air for such purpose being provided with the pipe $h^4$, the products rising through the vertical chamber H' and escaping through the relief valve L of the second furnace. As soon as the two chambers B' of the gas superheating chamber B are sufficiently heated for the purpose the relief valve in the first furnace is closed and the heated products are caused to pass through the down-take passage B² and enter the horizontal body portion and assist the gases from the generators C D in heating up the checker work in the horizontal body portion, and passing also with all such gases into the primary fixing chamber to assist in heating up that chamber. In the first heating up of the apparatus, a slow combustion may be formed at the base of the coke or final fixing chamber G by the entrance of air, and any gases formed therein may be burned in the primary fixing chamber, air for supporting such combustion entering through the pipe G². The principal heating of such primary fixing chamber is obtained, however, from the three generators, the relief valve of the second furnace being closed and the heated products being forced downwardly through the chambers H² and flowing thence directly through the body of coke in the coke chamber G (in which case all air is shut off from such chamber) so that the coke in this chamber is heated by the direct contact of the hot waste products generated in the other parts of the furnace, and which are caused to flow through the coke in such way as to heat the same without consuming the coke, the coke being heated by contact of these heated products which pass downwardly through the same and escape through the annular chamber g, thence into the passage i, and rise through the superheater I. As some of such heated products may take up another portion of carbon in passing through the body of coke, an air entrance is provided at the base of the superheater to cause combustion of the same and aid in heating up the superheater. This is continued until the whole apparatus is brought to the desired temperature, the object being to heat the gas superheater B and the checker work and walls within the horizontal body portion E as highly as practicable, and to bring the primary fixing chamber H to a good fixing heat but not to such a heat as will cause the breaking up of the hydrocarbons and the deposit of carbon, and to bring the coke or final fixing chamber to but not beyond a red heat. This can be accomplished by means of several relief valves which may be operated to throw the current in different directions to produce this result. The air is then closed off from all parts of the apparatus, and it is ready for gas making. The operator then admits the steam superheated as above described, to the generator D, and passing up through the incandescent carbon therein forms water gas. This water gas then passes almost directly into the fixing chamber H. At the same time, oil and superheated steam are introduced at the top of the fixing chamber through the pipe or pipes $l$, the same being sprayed over the checker work in the central portion H' of the fixing chamber H and in the side portions H² thereof, and the gas passes upwardly through said central portion against any unvaporized oil which may pass downwardly through the same. As the oil and water gas are thus brought into contact within the heated fixing chamber, they are properly intermingled, the mass of the oil being vaporized, and the primary fixing of the gas being obtained, and as the gases reach the upper part of the fixing chamber they pass downwardly through the side portions H², the hydrocarbon gas or vapor being thoroughly intermingled therewith, and the combined gas and vapor passing downwardly into the body of coke, while any unvaporized portions of the oil percolate through the heated refractory materials and descend upon and are vaporized by the coke, and the water gas and hydrocarbon gases are brought into intimate contact with each other in the presence of the red hot coke. Part of the gases are fixed in the primary fixing chamber H, and as such gases with the water gas and vapor are commingled in the red hot carbon and are forced into intimate contact with each other within the pores and interstices thereof, a chemical action takes place between the gases and vapor which causes such a union as to generate a large portion of marsh and heavy hydrocarbon gases, the red hot carbon furnishing any necessary carbon for the formation of such gases, and the water gas providing the hydrogen for such purpose, the result of the downward passage of the gases and vapors first through the heated refractory material, causing such primary fixing, and then downwardly through the red hot coke, being the entire vaporization of the oil and the formation of a gas which is rich in hydrogen, marsh gas and illuminants, but contains but comparatively little carbonic oxide. Any of the oil descending through the central chamber H' and which is not vaporized is taken up by the gases or upon the checker work, and falls upon the surface of sand bed $h^5$ and is supported by such porous surface so that the gases may easily vaporize and take up the same.

During the time that the water gas is being generated in the generator D, the heat of the primary fixing chamber H is mainly depended upon for the primary fixing of the gases, but as the oil will have a chilling effect upon the same and would be liable to reduce it below the proper heat for fixing, I provide the necessary heat to assist such chamber in the primary fixing by superheating the water gas before introducing the oil into the same. This I accomplish with the gases formed in the cupola generators C and A'. For example, where the gas is being formed in the cupola generator C, the water gas passes up into the horizontal body portion E and through the masses of checker work $r\ r'\ r^2$ and the cross walls $p'$ in its course to the primary fixing chamber H, and a large amount of heat has been stored in such chamber and walls, the water gas so generated will be superheated and will be carried over into the fixing chamber at a sufficient heat to act upon the oil introduced into such chamber in such way as not only to quickly vaporize the same, but to either entirely fix or assist the materials in the fixing chamber in the primary fixing of the gases, and to carry the gases down into the body of red hot coke at a higher heat than they would naturally enter the same, and so also to assist by means of superheated gases, in maintaining the coke in the final fixing chamber G at the proper heat for fixing the gases. After this has been continued for some time, the steam is also admitted to the generator A' and the water gas formed passes upwardly from the same through the gas superheater B, traveling upwardly through the checker work in the side chambers B' and down through the central chamber $B^2$, the gas being still more highly superheated in this part of the apparatus than the horizontal body portion, as this is generally the last body of gas used, and the superheated gases so formed passing through the horizontal body portion to the fixing chamber and acting by their heat in the vaporizing and fixing of the gases as above described. During these operations the steam through the different chambers may, of course, be cut off as found desirable, being reduced or cut off in the generator D when the generator C is brought into play, and the same as to the generator A'. It is found in practice that this superheating of the water gas formed in the later part of the run, and the utilization of such superheated gases in vaporizing the oil and fixing the gases, is of great value in gas making, as an even quality of gas can be produced, the apparatus being run in such way that an even feeding of oil, according to the amount of gas generated, is obtained. For example, for making illuminating gas the process has been practiced by feeding three gallons of oil to one thousand feet of gas, and it is found that all of the oil is taken up as well by the gas formed in the last part of the run as by that formed in the first part of the run, and the gas made during the entire run is of very even quality. As the gases thus provide the necessary heat for fixing, the primary fixing chamber H need not be heated to such heat as would cause the breaking up of the hydrocarbons in the first part of the run, while the superheated gases themselves, by their intermingling with the oil vapor, act to vaporize and fix the same without the formation of carbon, a gas of very high illuminating quality being produced in this way with the employment of about three gallons of oil to the one thousand feet of gas. By the employment of the superheating water gas in the later part of the run, I am also enabled to extend the time of gas making in each run much beyond that of the ordinary gas making apparatus, and I overcome the necessity of the burning of so much fuel for heating up purposes.

After the apparatus has cooled down so as to require re-heating, the steam supply is cut off and air admitted to the several cupola generators, the relief valves being so manipulated as to properly utilize the heated products from the burning of the generator gases in the heating up of several bodies of checker work, &c., and the products so utilized are finally carried down through the mass of coke in the chamber G to heat the coke by direct contact and thence into the steam superheater and upwardly through the same, this being continued until the coke in the chamber G and the refractory material in the fixing chamber H are brought to the desired heat, the coal in the generators brought to the proper state of incandescence, and the remainder of the heat stored in the bodies of fixing material. It is also generally found desirable to admit air at the base of the coke chamber G for about a minute before gas making, so as to insure the heating up of the lower portion of the body of coke, and when this is done all air is closed off from the apparatus, and the gas making repeated as above described.

During all the blowing up and gas making operations, the products or gases formed are carried upwardly through the superheater, the products being permitted to escape through the relief valve thereon, while the gases are carried into the washer K and into the water-seal at the base thereof. It is found that the superheater absorbs the major portion of the heat from the gases, this being indicated by the fact that the upper portion thereof is not raised to any high heat, and the gases are also immediately subjected to the cooling action within the washer after passing from the superheater, as they are required to pass downwardly through the pipe *m* within the washer, the outer surface of which is cooled by the water flowing downwardly through the washer.

Figure 10:
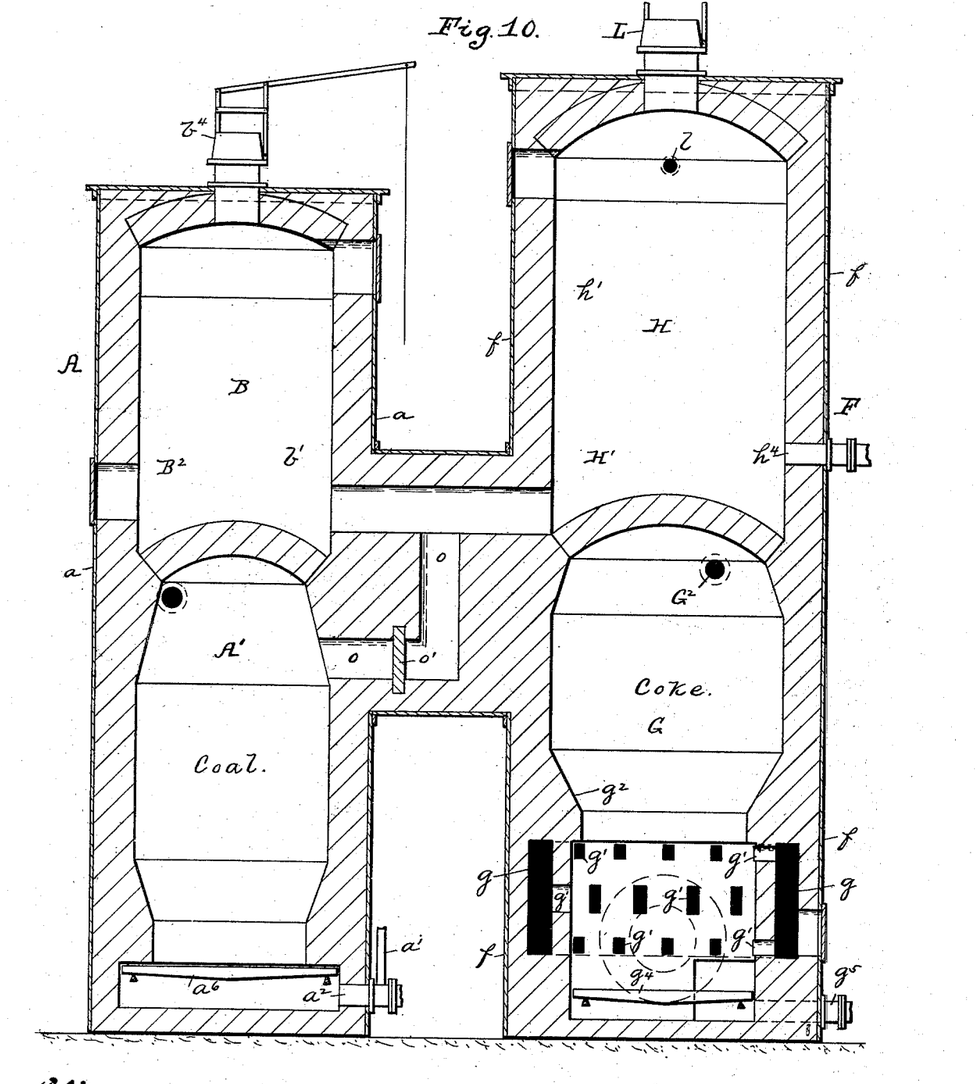
Fig. 10 is a longitudinal section of a modification of the apparatus.

In Fig. 10 I have illustrated a simple form of apparatus which may be employed to practice the process in small plants, and in which the horizontal body portion E is omitted, the two furnaces A F being brought close to each other and the cupola generator A' having a port *o* near the top thereof which communicates directly with the primary fixing chamber and which is controlled by the sliding valve *o'* of suitable refractory material. In such case, after the heating up of the apparatus, and the storing of the heat in the superheater B, in making the gas during the first part of the run the port *o* is opened, which permits the water gas formed in the generator A' to flow directly into the primary fixing chamber H and thence through the final fixing chamber G; and during the later part of the run this port *o* is closed so that the water gas formed in the generator A' is forced upwardly through the superheater B and the superheating gases are carried over into the primary fixing chamber, acting as above described in connection with the other figures of the drawings.

Some of the advantages obtained may be briefly stated as follows:—the provisions of large bodies of refractory material for the storing of heat to be subsequently utilized in the superheating of the gases; the utilization of such superheated gases to assist in the vaporizing and fixing of the hydrocarbons introduced; the ease of control of the entire apparatus for the practicing of the process, and the directing of the water gas through the different bodies of refractory material by the handling simply of suitable steam valves; the entire control of the apparatus during the blowing up operation by means of simple relief valves whereby the heat may be thrown in any direction desired for the proper heating of the fixing chambers and the high heating of the superheating chamber, as found desirable; simplicity and strength of construction, while providing for a long course of the gases through the apparatus, such, for example, as by the central longitudinal arches and walls supported by the same in the upper parts of the vertical furnaces, which give a specially durable and cheap form of up-take and down-take passages; the production of an even and high quality of illuminating gas from a small proportion of hydrocarbons; the utilization of all of the hydrocarbons in the making of such gas without the deposit of carbon, and the extending of the time of the run in the making of gases, without the necessity of too high heating of the fixing material. It is found that there is practically no residuum of heavy hydrocarbons from the apparatus, all such materials being utilized in the gas making.

The apparatus above described may be employed for making a fuel gas in the same way as has been fully described, except that the amount of hydrocarbons introduced will be reduced, or it may be employed in practicing the continuous process, which forms the subject matter of another application, Serial No. 417,668, in which a certain portion of the generator gas is combined with the water gas formed, in which case air may be introduced into one or more of the cupola generators at the same time that the steam is being introduced into the other cupola generator, the combined water and generator gases being carried through the apparatus in substantially the way above described, and the oil being introduced within the fixing chamber or at other suitable point, and the combined gases and vapors carried downwardly through the mass of coke, or other carbon, in the fixing chamber G which may be maintained at the desired heat by the introduction of a small quantity of air at the base of such chamber, which will serve to heat the coke within, the coke itself being burned to maintain it at the necessary heat for fixing the gases.

What I claim as my invention, and desire to secure by Letters Patent, is—

1. The herein-described process of making gas, consisting in generating water gas, and without superheating the gas introducing oil or like hydrocarbons into the water gas generated in the first part of the run and carrying the combined gas and vapors through a body of fixing materials, and generating water gas in the later part of the run superheating the same and introducing the oil into the resultant superheated water gas, and carrying such combined gas and vapor through a body of fixing materials, substantially as and for the purposes set forth.

2. The herein-described process of making gas, consisting in generating water gas, and without superheating the gas introducing oil or like hydrocarbons into the water gas generated, and carrying the combined gas and vapors through a body of heated refractory fixing material and then through a body of heated coke, and, in the later part of the run, generating water gas and superheating the same, introducing oil into the resultant superheated water gas and carrying such combined gas and vapor first through a body of heated refractory material and then through a body of heated carbon, substantially as and for the purposes set forth.

3. The herein-described process of making gas, consisting in generating gas from a mass of carbon, superheating the gas so generated, introducing hydrocarbons into the superheated gas, and carrying the combined superheated gas and vapor, and any fixed gases formed thereby, through a body of heated carbon, substantially as and for the purposes set forth.

4. The herein-described process of making gas, consisting in blowing up two or more generators, burning the gases formed to heat bodies of refractory material, and then carrying the heated products of combustion through a mass of carbon and thereby heating the same, and subsequently introducing steam into one of said generators, introducing hydrocarbons into the water gas formed, and carrying the same through the body of heated carbon, and, at a later part of the run, introducing steam into the other generator, carrying the water gas formed through a body of heated checker work to superheat the same, introducing hydrocarbons into such superheated water gas, and carrying the same through the body of heated carbon, substantially as and for the purposes set forth.

5. The herein-described process of making gas, consisting in blowing up two or more cupola generators, burning the gas formed to heat bodies of checker work, or like loose material, and carrying the heated products through a fixing chamber containing refractory material, and then downwardly through a mass of carbon to heat the same, then admitting steam to one of the cupola generators, carrying the products through the fixing chamber containing refractory material, and during their passage introducing hydrocarbons into the same and carrying the combined gas and vapor through the body of heated carbon, and at the later part of the run introducing steam into the other cupola generator, carrying the water gas formed through the heated bodies of checker work and the superheated water gas through the fixing chamber containing refractory material, and during their passage introducing hydrocarbons into the same, and the resultant superheated water gas and vapor through the heated carbon, substantially as and for the purposes set forth.

6. In apparatus for making gas, the combination of two vertical furnaces, a horizontal body portion connecting the same at a point about midway of the height of the furnaces and having depending vertical portions extending below the body portion and forming cupola generators, the same being inclosed within suitable casings, and the two vertical furnaces and cupola generators communicating with the horizontal body portion, substantially as and for the purposes set forth.

7. In apparatus for making gas, the combination of two vertical furnaces, a horizontal body portion connecting the same, the whole being inclosed within suitable casings, and the end walls of the horizontal portion being formed arch-shaped so as to support the lining of the vertical furnaces where they communicate with the body portion, and having ports formed through such arches between the body portion and the vertical furnaces, substantially as and for the purposes set forth.

8. In gas making apparatus, a vertical furnace having a solid central arch extending longitudinally across a portion thereof with spaces on each side of said arch and vertical walls supported on and extending upwardly from said arch toward but not quite to the top of the furnace and supported at the sides by the walls of the furnace, so forming a central chamber, said chamber having a port at the base thereof and communicating with the ports of the furnace on each side of said walls over the upper ends of the walls, substantially as and for the purposes set forth.

9. In a gas making apparatus, a vertical furnace having a central arch extending longitudinally across a portion thereof with spaces on each side of said arch and vertical walls supported on and extending upwardly from said arch toward the top of the furnace, and supported at the sides by the walls of the furnace, and a port opening above said arch at the base of the vertical chamber formed by said vertical walls, substantially as and for the purposes set forth.

10. In gas making apparatus, the combination of a vertical furnace having a coal chamber in the base thereof, a central arch extending across said chamber and having spaces on the sides thereof, vertical walls supported on and extending upwardly from said arch toward the top of the furnace chamber, a port opening above said arch tiles extending across the chambers on each side of the vertical chambers so formed between the arch and the side walls of the furnace, and checker work supported on such tiles, substantially as and for the purposes set forth.

11. In gas making apparatus, the combination of a vertical furnace having a coal chamber in the base thereof, a central arch extending across said chamber and having spaces on the sides thereof, vertical walls supported on and extending upwardly from said arch toward the top of the furnace chamber, a port opening above said arch tiles extending across the chambers on each side of the vertical chambers so formed between the arch and the side walls of the furnace, and a relief valve in the top wall of the furnace, substantially as and for the purposes set forth.

12. A gas making apparatus having a horizontal body portion, a vertical depending portion forming a cupola generator below the body portion, arches extending across above such generator, and cross walls extending from said arches to the top of the body portion, said cross walls having ports therein, communicating with the spaces on each side of the walls, substantially as and for the purposes set forth.

13. A gas making apparatus having at one end a vertical furnace containing a cupola generator in the lower part, and a gas superheater in the upper part, a horizontal body portion with which such gas superheater communicates, a vertical furnace with which the other end of the horizontal body portion communicates, said second vertical furnace having a fixing chamber containing refractory material in the upper part, and a coke chamber in the lower part provided with an outlet, substantially as and for the purposes set forth.

14. A gas making apparatus having at one end a vertical furnace containing a cupola generator in the lower part, and a gas superheater in the upper part, a horizontal body portion with which such gas superheater communicates, a vertical furnace with which the other end of the horizontal body portion communicates, said second vertical furnace having a fixing chamber containing refractory material in the upper part, and a coke chamber in the lower part provided with an outlet, and one or more depending portions extending below the horizontal body portion and forming cupola generators, substantially as and for the purposes set forth.

15. A gas making apparatus having a vertical furnace containing a fixing chamber or chambers, an outlet passage leading from the lower end thereof, a vertical steam superheater with which such passage communicates at the base, said superheater containing a coil of steam pipes, and a mass of checker work, and an outlet passage leading from the upper end of such steam superheater, substantially as and for the purposes set forth.

16. A gas making apparatus having a vertical furnace provided with a fixing chamber having a bed of sand at the base thereof, and having an oil entrance above said bed of sand, substantially as and for the purposes set forth.

17. A gas making apparatus having a vertical steam superheater, an inlet passage at the base leading from the gas generating and fixing apparatus, an outlet passage at the top, a vertical washer, and a pipe leading from the top of the gas superheater down through the washer and into a water-seal at the base thereof, substantially as and for the purposes set forth.

In testimony whereof I, the said JAMES L. HASTINGS, have hereunto set my hand.

JAMES L. HASTINGS.

Witnesses:
JAS. LOUGHRAN,
WM. J. SHETTSLINE.